United States Patent [19]

Miyagawa et al.

[11] Patent Number: 5,691,415
[45] Date of Patent: Nov. 25, 1997

[54] REINFORCED ELASTIC BODY AND PRODUCTION PROCESS THEREOF

[75] Inventors: Yasumichi Miyagawa; Kenji Kuwata, both of Yamaguchi, Japan

[73] Assignee: Tosoh Corporation, Yamaguchi, Japan

[21] Appl. No.: 457,301

[22] Filed: Jun. 1, 1995

Related U.S. Application Data

[63] Continuation of Ser. No. 179,820, Jan. 11, 1994, abandoned, which is a continuation of Ser. No. 961,862, Oct. 15, 1992, abandoned.

[30] Foreign Application Priority Data

Mar. 16, 1992 [JP] Japan ........................... 4-089316

[51] Int. Cl.⁶ ........................................... C08F 8/38
[52] U.S. Cl. ........................... 525/107; 525/109; 525/111
[58] Field of Search ........................ 525/107, 109, 525/111

[56] References Cited

U.S. PATENT DOCUMENTS

| | | | |
|---|---|---|---|
| 3,300,426 | 1/1967 | Hunsucker | 524/510 |
| 3,307,966 | 3/1967 | Shoaf | 428/395 |
| 3,879,337 | 4/1975 | Manino et al. | 524/576 |
| 4,978,409 | 12/1990 | Fujiwara et al. | 156/315 |
| 5,036,122 | 7/1991 | Auerbach et al. | 524/259 |
| 5,219,902 | 6/1993 | Mishima et al. | 523/206 |
| 5,281,638 | 1/1994 | Mowrey | 524/105 |
| 5,306,369 | 4/1994 | Fujiwara et al. | 156/110.1 |

FOREIGN PATENT DOCUMENTS

| | | |
|---|---|---|
| 124426 | 5/1989 | Japan . |
| 2170831 | 7/1990 | Japan . |

*Primary Examiner*—Vasu S. Jagannathan
*Assistant Examiner*—John J. Guarriello
*Attorney, Agent, or Firm*—Sughrue, Mion, Zinn, Macpeak & Seas, PLLC

[57] ABSTRACT

A reinforced elastic body is disclosed, which comprises a chlorosulfonated polyolefin reinforced with polyester fibers having an adhesive containing an isocyanate compound and/or an epoxy compound and an adhesive composed of a mixture of a resorcin-formaldehyde resin and a 2,3-dichlorobutadiene-containing polymer. Also, a production process of the reinforced elastic body is disclosed, which comprises vulcanizing-adhering polyester fibers treated with an adhesive containing an isocyanate compound and/or an epoxy compound and then treated with an adhesive composed of a mixture of a resorcin-formaldehyde resin and a 2,3-dichlorobutadiene-containing polymer to a chlorosulfonated olefin compounded material.

6 Claims, No Drawings

REINFORCED ELASTIC BODY AND PRODUCTION PROCESS THEREOF

This is a Continuation of application Ser. No. 08/179,820 now abandoned, filed on Jan. 11, 1994, which is a continuation of application Ser. No. 07/961,862 now abandoned, filed Oct. 15, 1992.

FIELD OF THE INVENTION

The present invention relates to a chlorosulfonated polyolefin elastic body reinforced with polyester fibers and a process of producing the reinforced elastic body. More particularly, the present invention relates to a chlorosulfonated polyolefin elastic body reinforced with polyester fibers subjected to a specific surface treatment and a process of producing the reinforced elastic body.

The reinforced elastic body of the present invention is suitable as a polyester fiber-reinforced chlorosulfonated polyolefin structural material, such as various kinds of belts, hoses, sheets, etc.

BACKGROUND OF THE INVENTION

In general, a rubber is frequently used as a composite material with fibers. For example, for parts of motorcars or industrial parts, such as tires, belts, hoses, air springs, etc., a rubber is used as a composite material reinforced with fibers.

Hitherto, for adhering a rubber and fibers, a resorcin-formaldehyde resin rubber latex (hereinafter referred to as RFL) has been widely used as the adhesive. The adhesive property between a rubber and fibers is an important factor in the performance of the foregoing composite material and in particular, in the composite materials being used in dynamic fields, such as tires, belts, air springs, etc., a stronger adhesive force is required between a rubber and fibers than composite materials being used in static fields such as hoses, sheets, etc.

For obtaining a composite material composed of strongly adhered rubber and fibers, a method of treating fibers with various RFLs and reinforced elastic bodies using fibers treated with various RFLs have been proposed.

JP-A-2-170831 (the term "JP-A" as used herein means an "unexamined published Japanese patent application") proposed a method of adhering aromatic polyamide fibers and a rubber compounded material, wherein after treating the aromatic polyamide fibers with RFL composed of a halogen-containing polymer latex having a halogen content of at least 45% by weight and a resorcin-formaldehyde resin, the aromatic polyamide fibers are further treated with an adhesive composition containing a methylene acceptor, a methylene donor and an adhesive rubber compatible with a rubber polymer to be adhered and then are adhered to the rubber compounded material.

However, in the case of adhering the polyester fibers and a chlorosulfonated polyolefin compounded material by the foregoing adhesion method, a sufficient adhesive force can not be obtained. Also, in the foregoing method, after treating the fibers being used with RFL, the fibers are further treated with other adhesive composition, which gives a problem of making the steps troublesome.

Also, JP-B-1-24426 (the term "JP-B" as used herein means an "examined published Japanese patent application.") proposed a method of adhering a chloroprene rubber and fibers, wherein the fibers being used are treated with RFL composed of a latex of a composition of chloroprene and 2,3-dichloro-1,3-butadiene and a resorcin-formaldehyde resin and are adhered to the chloroprene rubber compounding material.

However, in the case of adhering polyester fibers and a chlorosulfonated polyolefin compounding material by the foregoing method, a sufficient adhesive force can not be obtained.

Furthermore, in the foregoing JP-A-2-170831 and JP-B-1-24426, the total solid component content in the RFL liquids is from 10 to 50% by weight.

It is desirable to lower the total solid component content in the RFL liquid for cost saving.

SUMMARY OF THE INVENTION

The object of the present invention is to provide a reinforced elastic body wherein polyester fibers are strongly adhered to a chlorosulfonated polyolefin.

Another object of the present invention is to provide a process of producing the foregoing reinforced elastic body.

As the result of various investigations based on the above-described technical theme, the inventors have discovered that polyester fibers treated with a treating liquid containing an isocyanate compound and/or an epoxy compound and further treated with a resorcin-formaldehyde rubber latex containing a resorcin-formaldehyde resin and a polymer latex containing 2,3-dichlorobutadiene (hereinafter referred to as 2,3-DCB) are strongly vulcanizing-adhered to a chlorosulfonated polyolefin, and have succeeded in attaining the present invention based on such discovery.

That is, according to the present invention, there is provided a chlorosulfonated polyolefin elastic body reinforced with polyester fibers coated with an adhesive containing an isocyanate compound and/or an epoxy compound and an adhesive composed of a mixture of a resorcin-formaldehyde resin and a 2,3-DCB-containing polymer.

DETAILED DESCRIPTION OF THE INVENTION

The reinforced elastic body wherein polyester fibers are strongly vulcanizing-adhered to the chlorosulfonated polyolefin compounded material can be obtained by the following three steps.

First, the 1st step is a pre-treatment step of polyester fibers with a treating liquid containing an isocyanate compound and/or an epoxy compound.

There is no particular restriction on the isocyanate compound and, for example, triphenylmethane triisocyanate, phenylthiophosphate isocyanate, and tolylene diisocyanate are used. Also, polyhydric alcohol-added isocyanates obtained by reacting the foregoing isocyanates and a compound having at least 2 active hydrogens in the molecule, such as trimethylolpropane, pentaerythritol, etc., isocyanate compounds obtained by blocking the isocyanate group of the foregoing isocyanates by reacting with phenols such as phenol, m-cresol, resorcin, etc.; tertiary alcohols such as tert-butyl alcohol, etc.; or secondary amines such as isopropylamine, etc., can be used.

The concentration of the isocyanate compound is in the range of 1% to 50%, preferably 2% to 20%, in the treating liquid.

There is also no particular restriction on the epoxy compound and the epoxy compound is a polyepoxy compound having at least 2 epoxy groups in the molecule and is usually obtained by reacting a halohydrin group and a polyhydric alcohol or a polyhydric phenol. Examples of these epoxy compounds are 1,4-diphenylmethane glycidyl ether obtained by the reaction of epichlorohydrin and bisphenol and polyethylene glycol diglycidyl ether obtained by the reaction of epichlorohydrin and polyethylene glycol.

The concentration of the epoxy compound is in the range of 1% to 50%, preferably 2% to 20%, in the treating liquid.

There is no particular restriction on the solvent for forming the treating liquid containing the isocyanate compound and/or the epoxy compound, and aromatic hydrocarbons such as benzene, toluene, etc.; aliphatic ketones such as acetone, methyl ethyl ketone, etc.; esters such as ethyl acetate, etc.; and halogenated hydrocarbons such as methylene chloride, etc., are used.

Also, the isocyanate compound obtained by blocking an isocyanate group or the polyepoxy compound can be used as a latex thereof.

These treating liquids may contain, if necessary, one or plural kinds of additives selected from natural rubber, a chloroprene rubber, a styrene-butadiene rubber, an acrylonitrile-butadiene rubber, a chlorinated polyethylene, a chlorosulfonated polyethylene, an epichlorohydrin rubber, a natural rubber latex, a chloroprene rubber latex, a styrene-butadiene rubber latex, an acrylonitrile-butadiene rubber latex, a styrene-butadiene-vinylpyridine terpolymer latex, etc.

The 2nd step is a step of further treating the polyester fibers pre-treated in the 1st step with the RFL liquid containing a 2,3-DCB-containing polymer latex. The RFL liquid is an aqueous solution formed by first adding a resorcin resin and formaldehyde to an aqueous sodium hydroxide solution, and after reacting both the components, adding a latex to the reaction mixture.

When the mol ratio of resorcin (hereinafter referred to as R) to formaldehyde (hereinafter referred to as F) is in the range of from 1/0.1 to 1/5, and preferably from 1/0.1 to 1/3, a strong adhesive force is obtained. Also, when the solid component ratio (weight ratio) of the latex to the sum of R and F is in the range of from 1/100 to 1/1, and preferably from 1/100 to 1/1.5, and the solid component content of the latex in the RFL liquid is in the range of from 1 to 50% by weight, and preferably from 1 to 40% by weight, a strong adhesive force is obtained. Furthermore, when the solid component concentration of the RFL liquid is in the range of from 2 to 50% by weight, and preferably from 3 to 30% by weight, a strong adhesive force is obtained.

In the present invention, it is particularly important that the 2,3-DCB-containing polymer latex is used as the latex and that an elastic composite material having a sufficient adhesive strength is used even if one uses the polyester fibers treated with the RFL liquid having the solid component concentration of not more than 10% by weight.

The 2,3-DCB-containing polymer latex is a latex of a polymer containing 2,3-DCB as a monomer unit and can be obtained by a known emulsion polymerization method. As the 2,3-DCB-containing polymer latex, a latex of a homopolymer of 2,3-DCB or a latex of a copolymer of 2,3-DCB and another monomer copolymerizable with 2,3-DCB can be used. As the comonomer, there are, for example, ethylene, propylene, chloroprene, butadiene, isoprene, vinyl chloride, vinylidene chloride, vinyl acetate, styrene, acrylonitrile, maleic anhydride, acrylic acid esters, and methacrylic acid esters. These comonomers can be used singly or as a mixture thereof.

In the present invention, it is preferred to use a 2,3-dichlorobutadiene homopolymer.

Also, the foregoing RFL liquid can contain, if necessary, one or plural latexes selected from a natural rubber latex, a chloroprene rubber latex, a styrene-butadiene rubber latex, an acrylonitrile-butadiene rubber latex, a chlorosulfonated polyethylene latex, a styrene-butadiene-vinylpyridine terpolymer latex, etc.

The solid content of these rubber latexes is in the range of not more than 90%, preferably not more than 70%, based on the solid content of the total latex in the RFL latex.

The 3rd step is a step of vulcanizing-adhering the surface-treated polyester fibers and the chlorosulfonated polyolefin.

A chlorosulfonated polyolefin is generally used by compounding with a rubber compounding agent such as a vulcanizing agent, an accelerator, a reinforcing agent, a filler, an aging inhibitor, etc. In the present invention, the surface-treated polyester fibers are stuck to the compounded material of the chlorosulfonated polyolefin and one vulcanizes the assembly, whereby the vulcanization with the chlorosulfonated polyolefin and the adherence to the polyester fibers are simultaneously carried out to provide the reinforced elastic body.

As a vulcanizing method for carrying out the vulcanizing adhere, there are a press vulcanization, a steam vulcanization, a hot air vulcanization, a UHF vulcanization, an electron ray vulcanization, a molten salt bath vulcanization, etc. Any of these methods can be used in the present invention.

The chlorosulfonated polyolefin in this invention is a general term for the products obtained by chlorinating and chlorosulfonating polyolefins. For example, according to the kind of the raw material polyolefin being used for the chlorosulfonating reaction there are chlorosulfonated polyethylene, a chlorosulfonated ethylene-propylene copolymer, a chlorosulfonated ethylene-butene 1 copolymer, a chlorosulfonated ethylene-hexene copolymer, and a chlorosulfonated ethylene-vinyl acetate copolymer.

In the present invention, it is preferred to use a chlorosulfonated polyolefin obtained by chlorinating and chlorosulfonating an ethylene-α-olefin copolymer having a density of less than 0.94 g/cc.

As commercially available chlorosulfonated polyolefins at present, there are TOSO-CSM series (trade name, made by Tosoh Corporation) and the grades thereof are TS-530, TS-430, TS-220, CN-1180, CN-1250, CN-1290, TS-930, etc.

In addition, when the reinforced elastic body of the present invention is used in dynamic fields such as in tires, belts, air springs, etc., the use of the chlorosulfonated polyolefins excellent in flexing properties, etc., such as a chlorosulfonated ethylene-propylene copolymer, a chlorosulfonated ethylene-butene 1 copolymer, a chlorosulfonated ethylene-hexene copolymer, a chlorosulfonated ethylene-vinyl acetate copolymer, etc., is preferred.

As the polyester fibers used in this invention, there are polyethylene terephthalate fibers as well as polyethylene terephthalate-isophthalate fibers, terephthalic acid-p-oxybenzoic acid-ethylene glycol copolymer fibers, methoxypolyethylene glycol-pentaerythritol-ethylene terephthalate copolymer fibers, etc., and they can be used in various forms of codes, fabrics, nonwoven fabrics, sheets, films, felts, etc.

The following examples are intended to illustrate the present invention in more detail but not to limit it in any way.

The rubbers, the latexes, and the compounding agents being used in the examples and the comparison examples and also the preparations thereof are explained first.

Sample A Chlorosulfonated ethylene-butene 1 copolymer):

A chlorosulfonated ethylene-butene 1 copolymer having a Mooney viscosity of 42 ($ML_{1+4}$ 100° C.), a chlorine content of 26 wt. %, and a sulfur content of 0.7 wt. % obtained by charging 2,800 g of a straight chain low-density polyethylene having MI (melt index) of 4, a density of 0.92, and mol ratio of butene 1 to ethylene of 5/95 and 28,000 g of carbon tetrachloride in a 30 liter reaction vessel equipped with a pressure controller, a temperature controller, a condenser, and a stirrer, and carrying out the chlorination and chlorosulfonation at a reaction temperature of 100° C. while adding thereto sulfuryl chloride.

Chlorosulfonated Polyethylene:

Chlorosulfonated polyethylene, TOSO-CSM TS-530 (trade name, made by Tosoh Corporation, Mobhey viscosity 56 ($ML_{1+4}$ 100° C.), chlorine content 35 wt %, sulfur content 1.0 wt %).

Chloroprene Rubber A:

Chloroprene rubber, Skyprene B-5 (trade name, made by Tosoh Corporation, Mooney viscosity 49 ($ML_{1+4}$ 100° C.)).

Chloroprene Rubber B:

Chloroprene rubber, Skyprene B-30 (trade name, made by Tosoh Corporation, Mooney viscosity 49 ($ML_{1+4}$ 100° C.)).

2,3-DCB Homopolymer Latex:

In a 10 liter reaction vessel equipped with a pressure meter, a temperature controller, a condenser, and a stirrer were charged 2,000 g of a 2,3-DCB monomer and 6 g of n-dodecylmercaptane as a chain transferring agent. Then, a mixture of 4,000 g of water, 72 g of a disproportionated rosin soap as an emulsifier, 7 g of a condensation product of sodium naphthalenesulfonate and formaldehyde, and 24.2 g of an aqueous 20% sodium hydroxide solution was added thereto followed by carrying out the emulsification. Then, in 200 g of water were dissolved 0.25 g of hydrosulfite, 1.8 g of potassium persulfate, and 0.3 g of sodium anthraquinonesulfonate as polymerization catalysts, the solution thus obtained was added to the emulsified mixture and the polymerization was carried out at a temperature of from 10° to 50° C. Then, by removing unreacted monomers by steam distillation, a 2,3-DCB homopolymer latex having a solid component content of 33.8% was obtained.

Chloroprene-2,3-DCB Copolymer Latex:

By following the same procedure as the foregoing case of producing the 2,3-DCB homopolymer latex except that 400 g of a chloroprene monomer and 1,600 g of the 2,3-DCB monomer were used in place of 2,000 g of the 2,3-DCB monomer, a chloroprene-2,3-DCB copolymer latex having a solid component content of 33.8% was obtained.

Chloroprene Rubber Latex:

Chloroprene rubber latex, Skyprene LA-502 (trade name, made by Tosoh Corporation, solid component content 52%).

Vinylpyridine Latex:

Vinylpyridine latex, Nipol 2518FS (trade name, made by Nippon Zeon Co., Ltd., solid component content 40.5%).

SBR Latex:

SBR latex, Nipol LX-110 (trade name, made by Nippon Zeon Co., Ltd., solid component content 40.5%).

NBR Latex:

NBR latex, Nipol 1562 (trade name, made by Nippon Zeon Co., Ltd., solid component content 41%).

N-phenyl-N'-isopropyl-p-phenylenediamine dispersion (50%)

Nocrack 810-NA (trade name, made by Ouchi Shinko Kagaku Kogyo K. K.).

Chlorinated natural rubber:

CR-150 (trade name, made by Asahi Denka Kogyo K. K., chlorine content 65%).

Hexamethylenetetramine:

Nocseler H (trade name, made by Ouchi Shinko Kagaku Kogyo K. K.).

Desmodur R: (trade name, made by Bayer A. G., triphenylmethane triisocyanate).

EXAMPLE 1

After immersing a polyester ,fiber code of 1100D/2×5 in a fiber pre-treating liquid having the composition shown in Table 1 below, the polyester fiber code was dried for 3 minutes and baked in a dryer kept at a constant temperature of 180° C. Furthermore, after immersing the code in a RFL liquid having the composition shown in Table 1, the code was dried for 3 minutes and baked in a dryer kept at a constant temperature of 180° C.

The treated code thus prepared was placed on a unvulcanized rubber compounded material I shown below and they were vulcanizing-adhered for 30 minutes at 160° C. to provide a test piece.

Unvulcanized Rubber Compound Material I:

|  | (weight parts) |
|---|---|
| Sample A | 100 |
| Magnesium Oxide | 4 |
| SRF Carbon Black (grade name: Seast S, trade name, made by Tokai Carbon Co., Ltd.) | 40 |
| Pentaerythritol | 3 |
| Dipentalmethylenethiuram Tetrasulfide | 2 |

The adhesive force (180 degree peeling off strength) of the adhered product of the rubber and the fibers thus obtained was measured by a tensile testing machine by a tension speed of 50 mm/minute. The result obtained is shown in Table 1.

EXAMPLES 2 TO 8

By following the same vulcanizing-adhesion as Example 1 except that the RFL liquid composition was changed as shown in Table 1 below, test pieces were prepared and the adhesive force of each test piece was measured as in Example 1. The results are shown in Table 1.

EXAMPLE 9

By following the same vulcanizing-adhesion as Example 1 except that unvulcanized rubber compounded material II shown below was used in place of the unvulcanized rubber compounded material, a test piece was prepared and the adhesive force thereof was measured.

Unvulcanized Ribber Compound Material II:

|  | (weight parts) |
|---|---|
| TS-530 (trade name, made by Tosoh Corporation) | 100 |
| Magnesium Oxide | 4 |
| SRF Carbon Black (grade name: Seast S, trade name, made by Tokai Carbon Co., Ltd.) | 40 |

-continued

| | (weight parts) |
|---|---|
| Pemtaerythritol | 3 |
| Dipentamethylenethiuram Tetrasulfide | 2 |

The result obtained is shown in Table 1.

COMPARISON EXAMPLES 1 TO 4

By following the same vulcanizing-adhesion as Example 1 except that the RFL liquid composition was changed as shown in Table 2 below, test pieces were prepared and the adhesive force of each test piece was measured as in Example 1. The results obtained are shown in Table 2 below.

COMPARISON EXAMPLE 5

After immersing a polyester fiber code of 1100D/2×5 in a fiber pre-treating liquid having the composition shown in Table 2 below, the polyester fiber code was dried for 2 minutes and baked in a dryer kept at a constant temperature of 200° C. Thereafter, after immersing the code in a RFL liquid having the composition shown in Table 2 below, the code was dried for 2 minutes and baked in a dryer kept at a constant temperature of 200° C. Further, after immersing the code in a post-treating liquid having the composition shown in Table 2 below, the code was dried for 2 minutes and baked in a dryer kept at a constant temperature of 200° C.

The treated code thus prepared was placed on an unvulcanized rubber compounded material III having the composition shown below and vulcanizing-adhered thereto for 30 minutes at 150° C. to provide a test piece.

Unvulcanized Rubber Compounded Material III:

| | (weight parts) |
|---|---|
| Natural Rubber | 100 |
| Stearic Acid | 2 |
| 2,2,4-Trimethyl-1,2-dihydroquinoline | 0.2 |
| FEF Carbon Black (grade name: Seast SO, trade name, made by Tokai Carbon Co., Ltd.) | 45 |
| Process Oil | 5 |
| N-Oxydiethylene-2-benzothiazyl Sulfenamide | 1 |
| Sulfur | 2.5 |
| Zinc White | 5 |

The adhesive force of the adhered product of the rubber and fibers thus obtained was measured as in Example 1. The result obtained is shown in Table 2.

COMPARISON EXAMPLE 6

By following the same vulcanizing-adhesion as Comparison Example 5 except that unvulcanized rubber compounded material IV having the composition shown below was used in place of the unvulcanized rubber compounded material, a test piece was prepared and the adhesive force thereof was measured as in Example 1.

Unvulcanized Rubber Compounded Material IV:

| | (weight part) |
|---|---|
| Skyprene B-5 (trade name, made by Tosoh Corporation) | 100 |
| Magnesium Oxide | 4 |
| Stearic Acid | 0.5 |

| | (weight part) |
|---|---|
| 2,2,4-Trimethyl-1,2-dihydroquinone | 0.5 |
| N,N-Di-β-naphthyl-p-phenylenediamine | 0.5 |
| SRF Carbon Black (grade name: Seast S, trade name, made by Tokai Carbon Co., Ltd.) | 40 |
| Process Oil | 10 |
| Zinc White | 5 |
| 2-Mercaptoimidazolin | 0.5 |

The result obtained is shown in Table 2 below.

COMPARISON EXAMPLE 7

By following the same vulcanizing-adhesion as Comparison Example 5 except that the unvulcanized rubber compound material I was used in place of the unvulcanized rubber compound material, a test piece was prepared and the adhesive force thereof was measured as in Example 1. The result obtained is shown in Table 2.

COMPARISON EXAMPLE 8

After immersing a polyester fiber code of 1100D/2×5 in a RFL liquid having the composition shown in Table 2 below, the code was dried for 2 minutes in a dryer kept at a constant temperature of 120° C. and baked for 6 minutes in a dryer at a constant temperature of 150° C. Thereafter, the code was subjected to a heat set for 3 minutes in a dryer kept at a constant temperature of 200° C.

The treated code thus prepared was placed on an unvulcanized rubber compounded material V shown below and vulcanizing-adhered thereto for 40 minutes at 150° C. to provide a test piece.

Unvulcanized Rubber Compounded Material V:

| | (weight parts) |
|---|---|
| Skyprene B-30 (trade name, made by Tosoh Corporation) | 100 |
| Stearic Acid | 0.5 |
| SRF Carbon Black (grade name: Seast S, trade name, made by Tokai Carbon Co., Ltd.) | 40 |
| Clay | 15 |
| Wax | 4 |
| Process Oil | 18 |
| Zinc White | 5 |
| Di-o-tolylguanidine | 1 |
| Tetramethylthiuram Monosulfide | 1 |
| Sodium Dimethyldithiocarbamate | 0.3 |

The result obtained is shown in Table 2.

COMPARISON EXAMPLE 9

By following the same vulcanizing-adhesion as Comparison Example 8 except that the unvulcanized rubber compounded material I was used in place of the unvulcanized rubber compounded material, a test piece was prepared and the adhesive force thereof was measured as in Example 1. The result obtained is shown in Table 2.

TABLE 1

| | Example | | | | | | | | |
|---|---|---|---|---|---|---|---|---|---|
| | 1 | 2 | 3 | 4 | 5 | 6 | 7 | 8 | 9 |
| Pre-Treating Liquid: | | | | | | | | | |
| Desmodur R, | 5 | 5 | 5 | 5 | 5 | 5 | 5 | 5 | 5 |
| Methylene Chloride | 95 | 95 | 95 | 95 | 95 | 95 | 95 | 95 | 95 |
| RFL Liquid: | | | | | | | | | |
| Resorcin, | 11.0 | 11.0 | 11.0 | 12.6 | 8.3 | 4.9 | 11.0 | 11.0 | 11.0 |
| 35% Formalin, | 10.3 | 8.6 | 10.3 | 11.8 | 7.7 | 4.6 | 10.3 | 10.3 | 10.3 |
| Sodium Hydroxide, | 1.0 | 1.0 | 0.3 | 1.1 | 0.8 | 0.4 | 1.0 | 1.0 | 1.0 |
| 2,3-DCB Homopolymer Latex, | 295.0 | 295.3 | 295.3 | 338.3 | 221.8 | 131.2 | 147.9 | 74.0 | 295.0 |
| Chloroprene Rubber Latex, | | | | | | | | | |
| Vinylpyridine Latex, | | | | | | | | | |
| SBR Latex, | | | | | | | | | |
| NBR Latex, | | | | | | | | | |
| Chloroprene-2, 3-DCB-Copolymer Latex, | | | | | | | | | |
| N-Phenylene-N'-isopropyl-p-phenylenediamine Dispersion (50%), | | | | | | | | | |
| Water | 325.0 | 325.4 | 325.4 | 278.0 | 403.7 | 501.2 | 472.1 | 546.0 | 325.0 |
| Post-Treating Liquid: | | | | | | | | | |
| Natural Rubber, | | | | | | | | | |
| Chlorinated Natural Rubber, | | | | | | | | | |
| Hexamethylenetetramine, | | | | | | | | | |
| Resorcin, | | | | | | | | | |
| Toluene | | | | | | | | | |
| Adhesive Force: (kg/number of fibers) | 15 or more | 15 or more | 15 or more | 15 or more | 15 or more | 15 or more | 15 or more | 15 or more | 8.0 |
| Peeling Off State: | R | R | R | R | R | R | R | R | R |

TABLE 2

| | Comparison Example | | | | | | | | |
|---|---|---|---|---|---|---|---|---|---|
| | 1 | 2 | 3 | 4 | 5 | 6 | 7 | 8 | 9 |
| Pre-Treating Liquid: | | | | | | | | | |
| Desmodur R | 5 | 5 | 5 | 5 | 5 | 5 | 5 | | |
| Methylene Chloride | 95 | 95 | 95 | 95 | 95 | 95 | 95 | | |
| RFL Liquid: | 11.0 | 11.0 | 11.0 | 11.0 | 20.2 | 20.2 | 20.2 | 11.9 | 11.9 |
| Resorcin, | | | | | | | | | |
| 35% Formalin, | 10.3 | 10.3 | 10.3 | 10.3 | 35.9 | 35.9 | 35.9 | 18.2 | 18.2 |
| Sodium Hydroxide, | 1.0 | 1.0 | 1.0 | 1.0 | 1.0 | 1.0 | 1.0 | 0.3 | 0.3 |
| 2,3-DCB Homopolymer Latex, | | | | | 249.0 | 249.0 | 249.0 | | |
| Chloroprene Rubber Latex, | 192.0 | | | | | | | | |
| Vinylpyridine Latex, | | 247.0 | | | | | | | |
| SBR Latex, | | | 247.0 | | | | | | |
| NBR Latex, | | | | 244.0 | | | | | |
| Chloroprene-2, 3-DCB-Copolymer Latex, | | | | | | | | 319.6 | 319.6 |
| N-Phenylene-N'-isopropyl-p-phenylenediamine Dispersion (50%), | | | | | | | | 10.8 | 10.8 |
| Water | 428.0 | 373.0 | 373.0 | 376.0 | 336.2 | 336.2 | 336.2 | 218.5 | 218.5 |
| Post-Treating Liquid: | | | | | | | | | |
| Natural Rubber, | | | | | 2.8 | 2.8 | 2.8 | | |
| Chlorinated Natural Rubber, | | | | | 11.2 | 11.2 | 11.2 | | |
| Hexamethylenetetramine, | | | | | 1.0 | 1.0 | 1.0 | | |
| Resorcin, | | | | | 2.0 | 2.0 | 2.0 | | |
| Toluene, | | | | | 83.0 | 83.0 | 83.0 | | |
| Adhesive Force: (kg/number of fibers) | 1.8 | 0.5 | 0.5 | 2.0 | 0.8 | 0.3 | 0.3 | 1.0 | 0.5 |
| Peeling Off State: | R-C | R-C | R-C | R-C | R-C | R-C | R-C | R-C | R-C |

In Tables 1 and 2, "R" means rubber aggregation broken and "R-C" means rubber-adhesive interface broken.

As is clear from the above explanations, according to the present invention, a reinforced elastic body wherein polyester fibers are strongly adhered to a chlorosulfonated polyolefin, which has been difficult by conventional techniques, is obtained. Thus, new demand fields of V-belts, poly-V-belts, sheets, hoses, etc., using a chlorosulfonated polyolefin are developed.

The reinforced elastic bodies of the present invention provide an excellent performance as new motorcar parts or industrial parts.

While the invention has been described in detail and with reference to specific embodiments thereof, it will be apparent to one skilled in the art that various changes and modifications can be made therein without departing from the spirit and scope thereof.

What is claimed is:

1. A reinforced elastic body consisting essentially of a chlorosulfonated polyolefin reinforced with polyester fibers having an adhesive containing an isocyanate compound and an adhesive composed of a mixture of a resorcin-formaldehyde resin and a 2,3-dichlorobutadiene-containing polymer latex, wherein the molar ratio of resorcin to formaldehyde is from 1:0.1 to 1:5, and the solid component weight ratio of the latex to the sum of resorcin and formaldehyde is from 1/100 to 1/1.

2. The reinforced elastic body of claim 1, wherein said 2,3-dichlorobutadiene-containing polymer is a 2,3-dichlorobutadiene homopolymer.

3. The reinforced elastic body of claim 1, wherein said chlorosulfonated polyolefin is a chlorosulfonated polyolefin obtained by chlorinating and chlorosulfonating an ethylene-α-olefin copolymer having a density of less than 0.94 g/cc.

4. A process of producing a reinforced elastic body comprising a chlorosulfonated polyolefin reinforced with polyester fibers having an adhesive containing an isocyanate compound and an adhesive composed of a liquid mixture of a resorcin-formaldehyde resin and a 2,3-dichlorobutadiene-containing polymer latex, which process consists essentially of vulcanizing-adhering the chlorosulfonated polyolefin and the polyester fibers treated with an adhesive containing an isocyanate compound and then treated with an adhesive composed of a mixture of a resorcin-formaldehyde resin and a 2,3-dichlorobutadiene-containing polymer latex, wherein the molar ratio of resorcin to formaldehyde is from 1:0.1 to 1:5, and the solid component weight ratio of the latex to the sum of resorcin and formaldehyde is from 1/100 to 1/1;

and wherein the liquid mixture of resorcin-formaldehyde resin and polymer latex has a solid component concentration of from 2 to 50% by weight.

5. The production process of the reinforced elastic body of claim 4, therein said 2,3-dichlorobutadiene-containing polymer is a 2,3-dichlorobutadiene homopolymer.

6. The production process of the reinforced elastic body of claim 4, wherein said chlorosulfonated polyolefin is a chlorosulfonated polyolefin obtained by chlorinating and chlorosulfonating an ethylene-α-olefin copolymer having a density of less than 0.94 g/cc.

* * * * *